United States Patent
Lee et al.

(10) Patent No.: US 8,379,095 B2
(45) Date of Patent: Feb. 19, 2013

(54) METHOD AND APPARATUS FOR DETERMINING PRESENCE OF USER'S HAND TREMOR OR INTENTIONAL MOTION

(75) Inventors: Dong-Hyuk Lee, Seoul (KR); Mu-Sik Kwon, Seoul (KR); Sang-Wook Oh, Ansan-si (KR); Seong-Taek Hwan, Pyeongtaek-si (KR)

(73) Assignee: Samsung Electronics Co., Ltd (KR)

( * ) Notice: Subject to any disclaimer, the term of this patent is extended or adjusted under 35 U.S.C. 154(b) by 321 days.

(21) Appl. No.: 12/814,024

(22) Filed: Jun. 11, 2010

(65) Prior Publication Data

US 2010/0316299 A1  Dec. 16, 2010

(30) Foreign Application Priority Data

Jun. 12, 2009 (KR) .................. 10-2009-0052556

(51) Int. Cl.
  *H04N 5/228* (2006.01)
  *G06K 9/00* (2006.01)
(52) U.S. Cl. .................... 348/208.3; 382/107
(58) Field of Classification Search .............. None
See application file for complete search history.

(56) References Cited

U.S. PATENT DOCUMENTS

| 7,924,317 B2* | 4/2011 | Lin ........................... 348/208.4 |
| 2006/0066728 A1 | 3/2006 | Batur |
| 2007/0183504 A1* | 8/2007 | Hoffman et al. ......... 375/240.16 |
| 2008/0111889 A1 | 5/2008 | Fujita et al. |

OTHER PUBLICATIONS

Paik et al., An Edge Detection Approach to Digital Image Stabilization Based on Tri-State Adaptive Linear Neurons, Jun. 1991, IEEE Transactions on Consumer Electronics, vol. 37, No. 3, pp. 521-530.*
Chen et al., Fast Integer-Pel and Fractional-Pel Motion Estimation for H.264/AVC, J. Vis. Commun. Image R. 17, Oct. 19, 2005.
Wang et al., "A Method for Fast Digital Image Stabilization", Fourth International Conference on Natural Computation, Oct. 18, 2008.
Li et al., "A Non-Cooperative Long-Range Biometric Image Tracking and Recognition (BITAR) Method for Maritime Surveillance", May 6, 2008.
Vella et al., "Digital Image Stabilization by Adaptive Block Motion Vectors Filtering", IEEE Transactions on Consumer Electronics, vol. 48, No. 3, Aug. 2002.

* cited by examiner

*Primary Examiner* — Stephen R Koziol
*Assistant Examiner* — Raphael Schwartz
(74) *Attorney, Agent, or Firm* — The Farrell Law Firm, P.C.

(57) ABSTRACT

A method is provided for determining presence of a user's hand tremor or intentional motion during recognition of an image through photographing. Image sample blocks of a previous frame are detected by using an edge detecting method. A block distance between the detected image sample block of the previous frame and an estimated image sample block of a current frame is calculated. The calculated block distance is compared with a first threshold. The calculated block distance is compared with a second threshold when the calculated block distance is less than the first threshold.

12 Claims, 7 Drawing Sheets

METHOD AND APPARATUS FOR DETERMINING PRESENCE OF USER'S HAND TREMOR OR INTENTIONAL MOTION

PRIORITY

This application claims priority under 35 U.S.C. §119(a) to an application entitled "Method And Apparatus For Determining Presence Of User's Hand Tremor Or Intentional Motion" filed with the Korean Intellectual Property Office on Jun. 12, 2009 and assigned Ser. No. 10-2009-0052556, the contents of which are incorporated herein by reference.

BACKGROUND OF THE INVENTION

1. Field of the Invention

The present invention relates generally to an apparatus and a method for detecting the motion of an object from input images, and more particularly, to a method for determining the presence of a user's hand tremor or intentional motion during the recognition of an image through photographing.

2. Description of the Related Art

The most frequently used methods for detecting a motion from a moving picture include block matching and optical flow. The block matching method, which is performed by sampling, has a high speed, and the optical flow method, which is performed by optimization, has a relatively lower speed but demonstrates a more precise performance. An Unsymmetric-cross Multi-Hexagon-grid Search (UMHexagonS) method, which is one of the block matching methods and is experimentally known to show the highest performance, is frequently used for high-speed motion detection. For example, the UMHexagonS method is described in detail in Zhibo Chen, et al., "Fast integer-pel and fractional-pcl motion estimation for H.264/AVC", Journal of Visual Communication & Image Representation (Online Available Oct. 19, 2005).

In the UMHexagonS method, a search area is sampled in each step. During sampling, a full range is first searched, and then the search range is narrowed to a local range. However, applications based on a mobile camera, which may include character recognition of an interest region, division of a region, and analysis of a region, require a motion existence determining method appropriate for the user environment. Accordingly, a precise motion detecting technique in an interest region is required that has a higher speed than a conventional technique. Also, in order to improve the calculation speed, a method for reducing a size of a block to be matched may be employed.

FIG. 1 is a diagram illustrating a difference in motion estimation according to a size of a block to be matched. In FIG. 1, to-be-matched blocks 10 and 20, before motion of an object, are indicated by dotted lines. To-be-matched blocks 12 and 22, after motion of the object, are indicated by solid lines. In recognizing characters on the surface, when larger-sized to-be-matched blocks 20 and 22 are used, there is a high possibility that the to-be-matched blocks 20 and 22 include edges on the surface. This increases the precision of motion detection, but decreases a detection speed. However, when smaller-sized to-be-matched blocks 10 and 12 are used, there is a high possibility that the to-be-matched blocks 10 and 12 do not include edges on the surface. This increases a motion detection speed but decreases a detection precision. Further, a hexagonal search method or a diamond search method has a low detection precision.

SUMMARY OF THE INVENTION

The present invention has been made to address at least the above problems and/or disadvantages and to provide at least the advantages described below. Accordingly, an aspect of the present invention provides a method and an apparatus for determining the presence of a user's hand tremor or intentional motion during the recognition of an image through photographing, in which a high detection speed and a high precision, required for a portable terminal such as a cellular phone, can be achieved.

According to one aspect of the present invention, a method is provided for determining presence of a user's hand tremor or intentional motion during recognition of an image through photographing. Image sample blocks of a previous frame are detected by using an edge detecting method. A block distance between the detected image sample block of the previous frame and an estimated image sample block of a current frame is calculated. The calculated block distance is compared with a first threshold. The calculated block distance is compared with a second threshold when the calculated block distance is less than the first threshold.

According to another aspect of the present invention, an apparatus is provided for determining presence of a user's hand tremor or intentional motion during recognition of an image through photographing. The apparatus includes an edge detector for detecting image sample blocks of a previous frame by using an edge detecting method. The apparatus also includes a motion vector extractor for calculating a block distance between the detected image sample block of the previous frame and an estimated image sample block of a current frame, and for comparing the calculated block distance with a first threshold. The apparatus further includes a motion determiner for comparing the calculated block distance with a second threshold when the calculated block distance is less than the first threshold.

According to a further embodiment of the present invention, a computer-readable recording medium storing a program causing a processor to execute a process for data processing is provided. Image sample blocks of a previous frame are detected by using an edge detecting method. A block distance between a detected image sample block of the previous frame and a corresponding estimated image sample block of a current frame is calculated. The calculated block distance is compared with a first threshold. The calculated block distance is compared with a second threshold when the calculated block distance is less than the first threshold.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
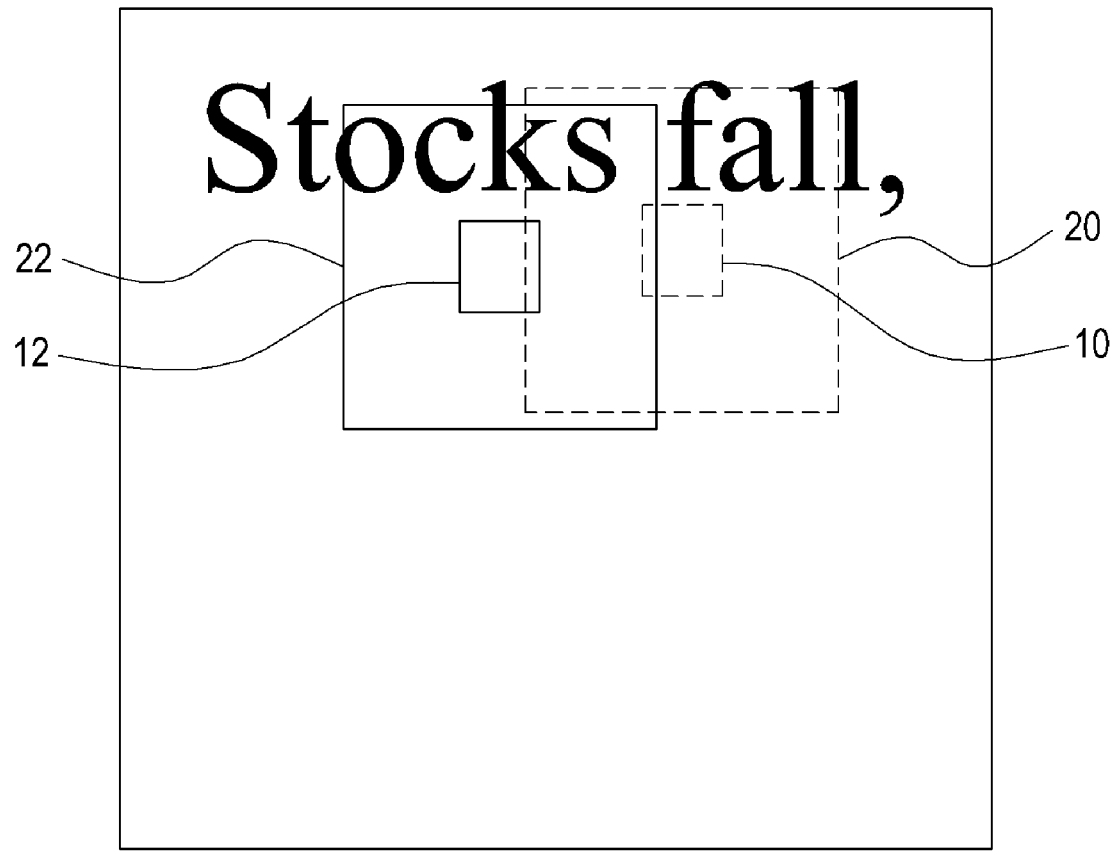
FIG. 1 is a diagram illustrating a difference in motion estimation according to a size of a block to be matched.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, in the embodiments of the present invention, although for convenience in understanding, the term "motion vector" is used, it is noted that the term "motion vector" or "motion vector magnitude" can be replaced by the term "block distance," because in the present invention, the presence of a user's hand tremor or intentional motion is determined by using only a block distance corresponding to a motion vector magnitude.

Figure 2:
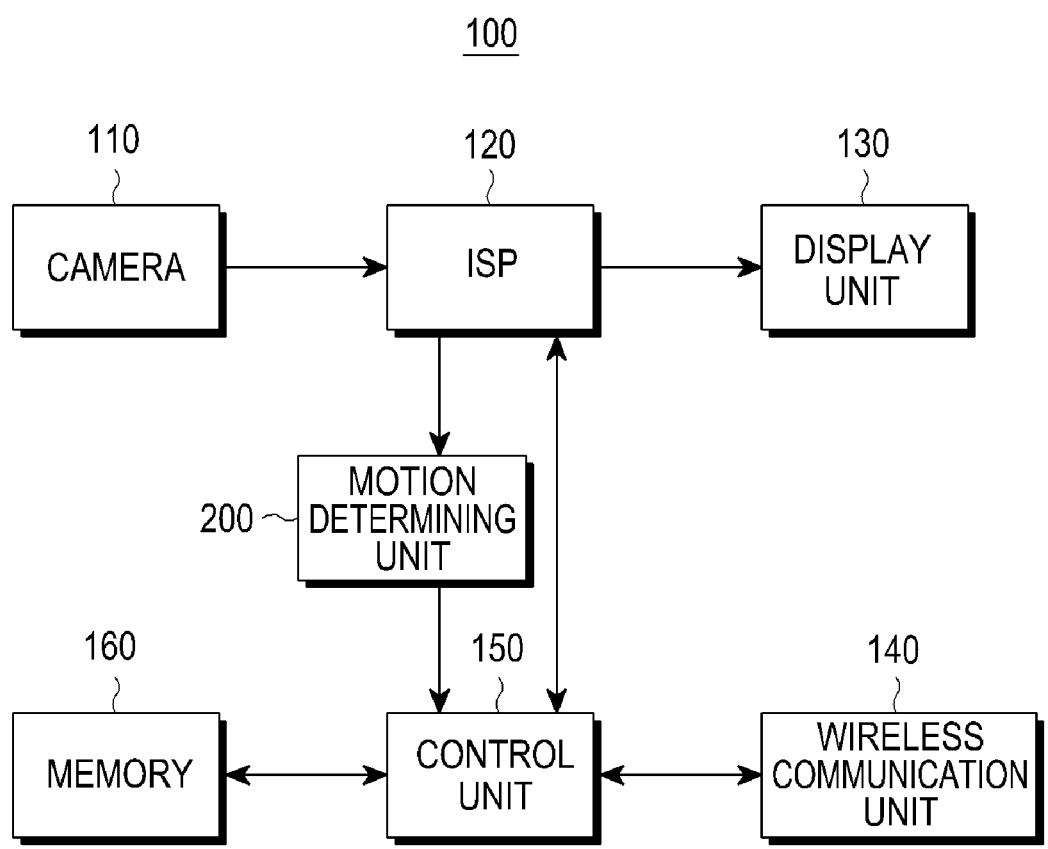
FIG. 2 is a diagram schematically illustrating a configuration of a portable terminal, which includes a motion determining unit for determining the presence of a user's hand tremor or intentional motion, according to an embodiment of the present invention.

FIG. 2 is a diagram schematically illustrating a configuration of a portable terminal, which includes a motion determining unit for determining the presence of a user's hand tremor or intentional motion, according to an embodiment of the present invention. An embodiment of the present invention provides a method for exactly determining the presence of a user's intentional motion, in which a user's motion (or an object's motion caused by the motion) occurring on a photographed image is divided into a user's hand tremor motion and a user's intentional motion. If the user's motion is caused by the user's hand tremor, it is determined that there is no user's motion A portable terminal 100 includes a camera 110, an Image Signal Processor (ISP) 120, a display unit 130, a wireless communication unit 140, a motion determining unit 200, a control unit 150, and a memory 160. Although the configuration of the portable terminal 100 is schematically shown in FIG. 2, the portable terminal 100 may further include a speaker, a microphone, a user input device, and the like.

The camera 110 forms an image of an object, and detects the formed image through an electrical signal. Although not shown, the camera 110 may include a lens system which includes at least one lens and forms an image of an object. The cameral may also include an image sensor for detecting the image formed by the lens system through an electrical signal, such as a Charge-Coupled Device (CCD) image sensor, a Complementary Metal-Oxide Semiconductor (CMOS) image sensor, or the like.

The ISP 120 processes an image signal input from the camera 110 by a frame unit under the control of the control unit 150, and outputs an image frame converted in accordance with a screen characteristic (size, image quality, resolution, or the like) of the display unit 130.

The display unit 130 displays the image frame input from the ISP 120 on a screen. The display unit 130 may include a Liquid Crystal Display (LCD) unit, a touch screen, or the like. The touch screen displays an image according to the control of the control unit 150, generates key contact interrupt when its surface comes in contact with a user input means, such as a finger or a stylus pen, and outputs user input information (including input coordinate, and input state) to the control unit 150. For example, when a character recognition application is executed by the control unit 150, the display unit 130 may display the image frame input from the ISP 120 in a preview state on the screen. Specifically, when a mobile-based application, such as character recognition, is executed, a user photographs an object within an interest region while checking the image in the preview state, displayed on the display unit 130, via the camera 110. The image input via the camera 110 is most influential to the performance of the application. Through the information on an object's motion, the application allows the object to be photographed when there is no object motion caused by the hand tremor, and thereby achieves stable performance. The object motion occurring in input images in time order includes an object's motion in a state where the camera is fixed, and a user's hand tremor or intentional motion in a state where the object is fixed.

The wireless communication unit 140 receives a wireless downstream signal from the air by using an antenna, and outputs downstream data obtained by demodulating the wireless downstream signal, to the control unit 150. Also, the wireless communication unit 140 generates a wireless upstream signal by modulating upstream data input from the control unit 150, and wirelessly transmits the generated wireless upstream signal to the air by using the antenna. This modulation/demodulation may be performed by Code Division Multiple Access (CDMA), or may be performed by Frequency Division Multiplexing (FDM), Time Division Multiplexing (TDM), or the like.

The motion determining unit 200 determines the presence of a user's hand tremor or intentional motion from image frames input from the ISP 120, and outputs the determined result to the control unit 150.

The memory 160 may store images for providing applications with various functions (such as a character recognition application) and their related Graphical User Interface (GUI), databases related to user information, documents, etc., background images (menu screen, stand-by screen, etc.) required for driving the portable terminal 100, operating programs, or the like.

The control unit 150 executes an application according to user input information, and the application performs a program operation according to the user input information. For example, when the character recognition application is being executed, and a user determines an interest region from the image shown on the display unit 130, the character recognition application performs a character recognition operation. The motion determining unit 200 determines the presence of a user's hand tremor or intentional motion from the image, and outputs the result to the control unit 150. which allows the character recognition application to exactly perform the character recognition operation by using such motion information. As described above, the user input information may be input to the control unit 150 via an additional user input device such as the display unit 130 or a keypad.

Figure 3:
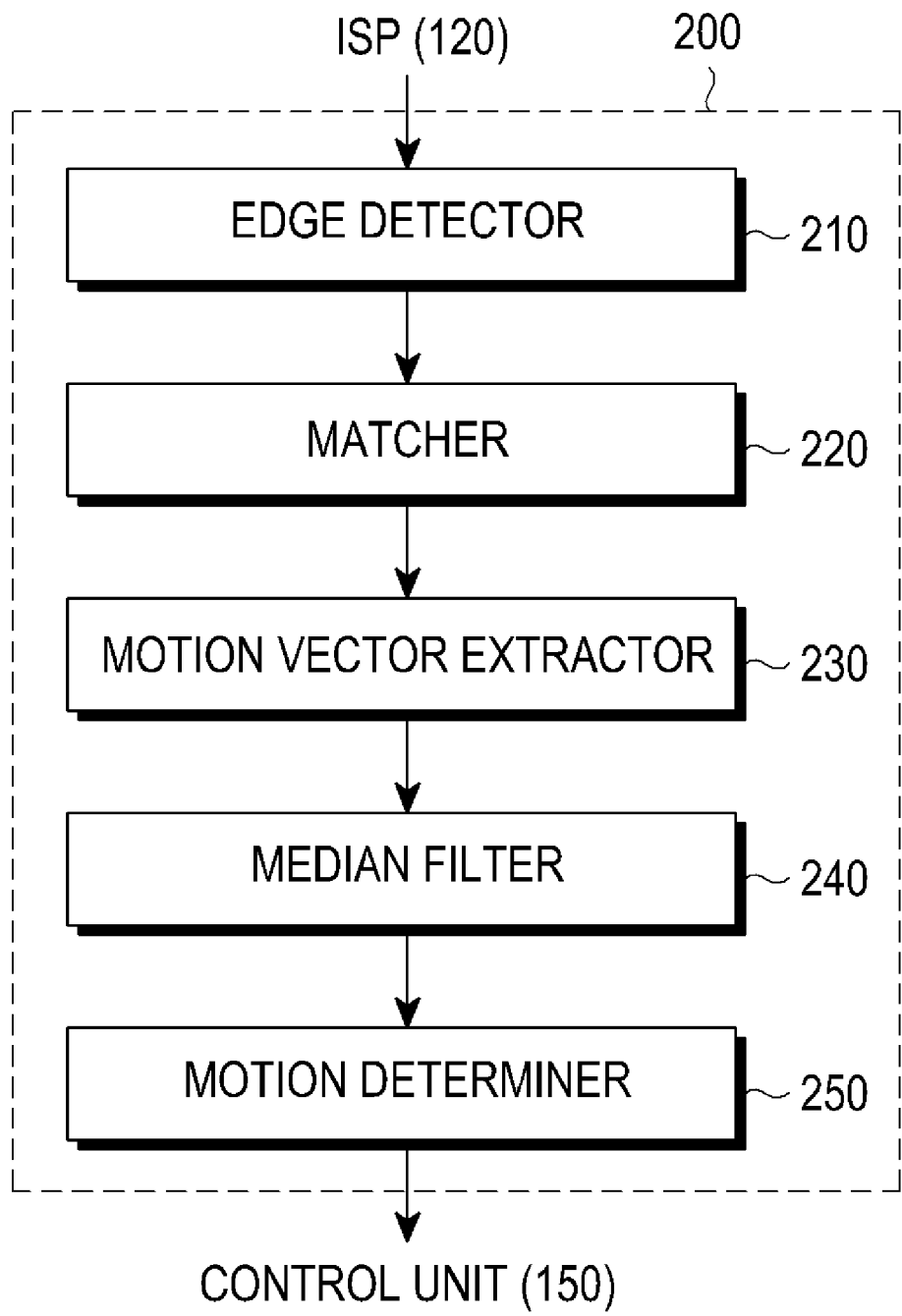
FIG. 3 is a diagram illustrating a detailed configuration of the motion determining unit shown in FIG. 2, according to an embodiment of the present invention.
Figure 4:
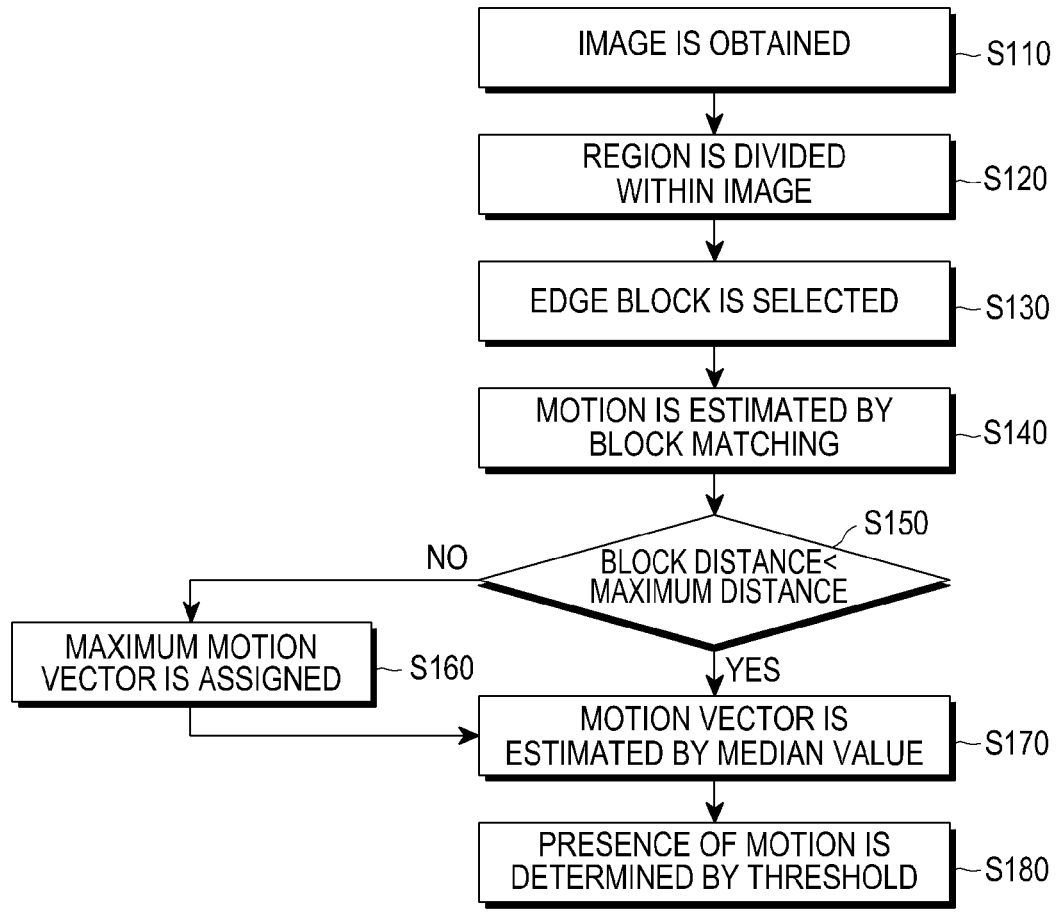
FIG. 4 is a flow chart illustrating a method of determining the presence of a user's hand tremor or intentional motion, according to an embodiment of the present invention.

FIG. 3 is a diagram illustrating a detailed configuration of the motion determining unit 200, and FIG. 4 is a flow chart illustrating a method of determining the presence of a user's hand tremor or intentional motion, according to an embodiment of the present invention.

The motion determining unit 200 includes an edge detector 210, a matcher 220, a motion vector extractor 230, a median filter 240, and a motion determiner 250.

The edge detector 210 receives an image frame from the image signal processor 120, in step S110 of FIG. 4.

In step S120, the edge detector 210 divides a user's determined interest region on an image shown on the display unit 130, or an interest region set according to a default value stored in the memory 160, into a plurality of blocks (or image blocks) in the image frame. This region division step S120 is a virtual step. For example, the interest region may be divided into N*N blocks. In this manner, the image frame is processed by a block unit in the edge detector 210.

Figure 5A:
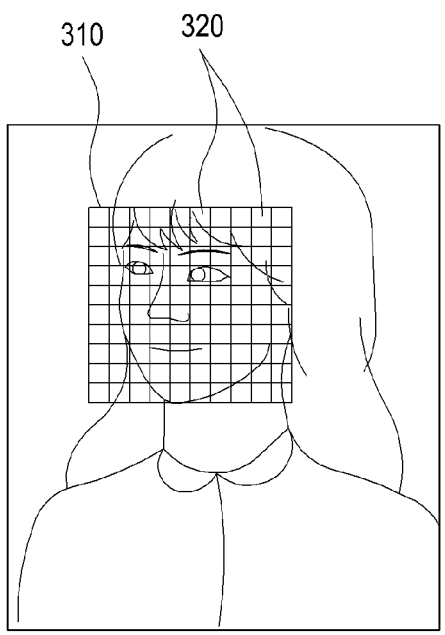
FIGS. 5A and 5B are diagrams illustrating a region division step and an image sample block detection step, shown in FIG. 4, according to an embodiment of the present invention.
Figure 5B:
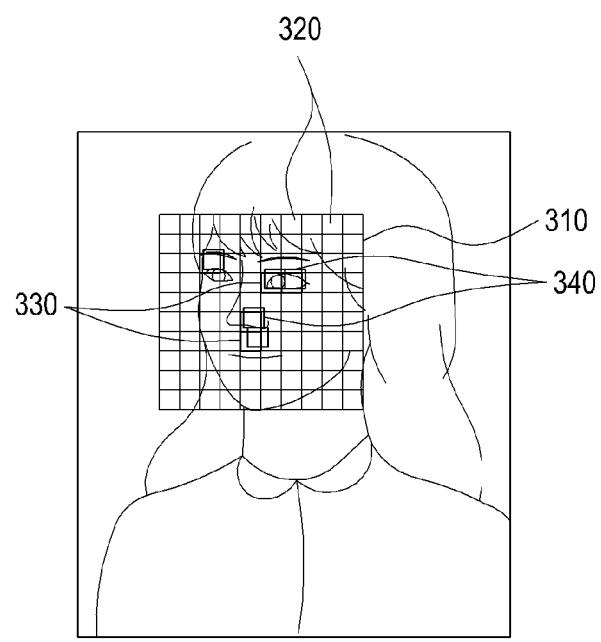

FIGS. 5A and 5B are diagrams illustrating the region division step and image sample block detection step S130, according to an embodiment of the present invention. FIG. 5A shows a previous image frame, in which on the previous image frame, an interest region 310 is set. The interest region 310 is divided into 10*10 blocks 320.

Referring again to FIGS. 3 and 4, in step S130, the edge detector 210 detects a predetermined number of image sample blocks (or edge blocks) having a large amount of high frequency components (edge components) from among the plurality of blocks. Specifically, the edge detector 210 detects image sample blocks including edge components from among the plurality of blocks. aligns the detected image sample Hocks in order from largest to smallest in amount of the high frequency components, and finally selects a predetermined number of image sample blocks having a larger amount of high frequency components from the aligned image sample blocks. A conventional Sobel edge detector may be used as the edge detector 210. The number of the image sample blocks is preferably set as an odd number, 2n+1(n=0, 1, 2, . . . ). which makes it easier to calculate a median value in a median filtering step as described below. Through the above-described selection of image sample blocks, it is possible to avoid an error in block matching which may be caused by the absence of a high frequency component. Also, in order to reduce computational complexity, the selected number of the image sample blocks is preferably set as less than 5.

FIG. 5B illustrates a current (or later) image frame having edge blocks 330 selected with respect to the previous image frame, and matching blocks 340 according to the motion of an object.

Steps S120 and S130 are performed with respect to the previous image frame, and later steps are performed with respect to the current image frame. The present motion detection method detects motion of the same object shown in two previous and current image frames in time order, and thus. image sample blocks to be motion-estimated are searched for in the previous image frame. and other image sample blocks to be matched with the image sample blocks (which correspond to the image sample blocks after the motion of the object, that is, matching blocks) are searched for in the current image frame. Specifically, a user's hand tremor or intentional motion is caught by comparing the image sample blocks detected from the previous image frame, to other image sample blocks estimated from the current image frame (i.e., the detected image sample blocks after the motion of the object).

In step S140 of FIG. 4, the matcher 220 searches for matching blocks corresponding to the image sample blocks by performing an adaptive neighborhood block search with respect to each of the selected image sample blocks. The motion vector extractor 230 estimates a motion vector with respect to each of the image sample blocks (or each of the matching blocks). In other embodiments of the present invention, the matcher 220 may be integrated into the motion vector extractor 230.

An adaptive 8 connected neighborhood search method may be employed as the adaptive neighborhood block search method. A search range is step-by-step widened in such a manner that first block matching is initially performed with respect to 8 blocks adjacent to an image sample block, and second block matching with respect to blocks adjacent to a first matching block is performed. Although the adaptive 8 connected neighborhood search method is described on one image sample block, it may be applied to other image sample blocks in the same manner.

FIGS. 6A-6E are diagrams illustrating the adaptive 8 connected neighborhood search method, according to an embodiment of the present invention.

Figure 6A:
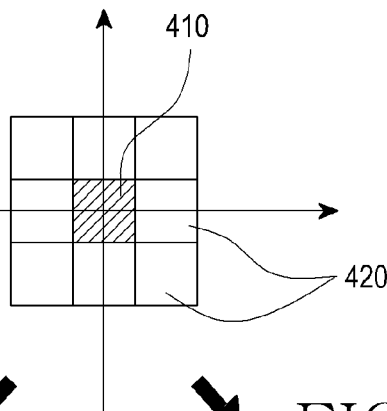
FIGS. 6A-6E are diagrams illustrating the adaptive 8 connected neighborhood block search method, according to an embodiment of the present invention.
Figure 6B:
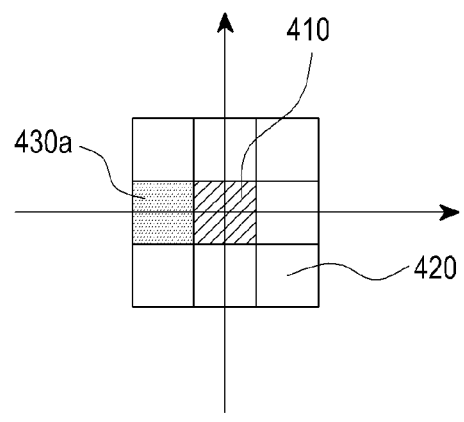

FIG. 6A shows an image sample block 410 in a to-be-searched previous image frame, and first 8 adjacent blocks 420 adjacent to the image sample block 410 in a current image frame. FIG. 6B shows a first matching block 430a searched for from the first 8 adjacent blocks 420. A matching block means a block assumed as the same or similar block as the image sample block 410. The matcher 220 calculates a Sum of Absolute Distance (SAD) value of each of the first adjacent blocks 420 with respect to the image sample block 410, and considers a first adjacent block having a smallest SAD value as the first matching block 430a.

Figure 6D:
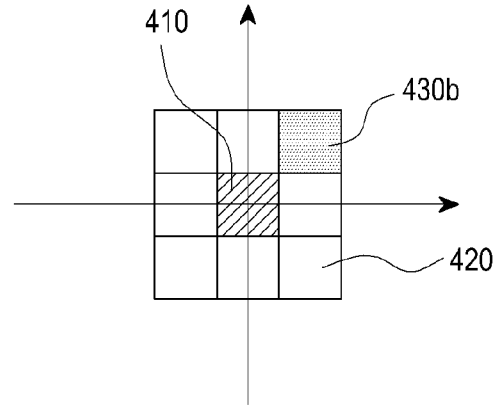
Figure 6C:
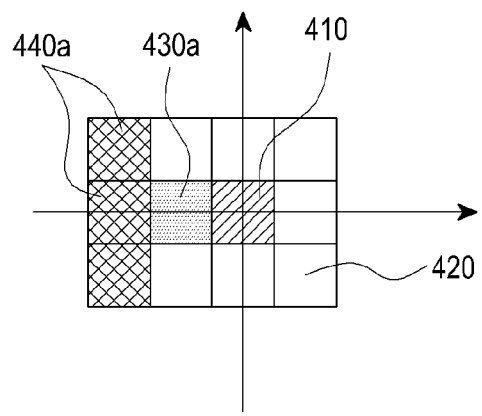

As shown in FIG. 6C, the matcher 220 selects second 3 adjacent blocks 440a adjacent to the first matching block 430a, calculates a SAD value of each of the second adjacent blocks 440a with respect to the image sample block 410, and considers a second adjacent block having the smallest SAD value as a second matching block. In this manner, the matcher 220 searches for matching blocks by step-by-step widening a search range, and this step-by-step matching block search step is repeated until the SAD value is less than a predetermined threshold, or is repeated within a predetermined block range. Also, a final matching block is determined as a matching block having the smallest SAD value, from among step-by-step matching blocks. Through this adaptive neighborhood block search method, it is possible to improve a motion estimation performance by widening a search range of a matching block, and at the same time to reduce the computational complexity.

FIGS. 6B and 6C show the first matching block 430a aligned in a row or a line with the image sample block 410. FIGS. 6D and GE show a first matching block 430b diagonally aligned with the image sample block 110. There is no difference between both cases in the search method, but the latter case has a greater number of second adjacent blocks 440b than those of the former case.

Figure 6E:
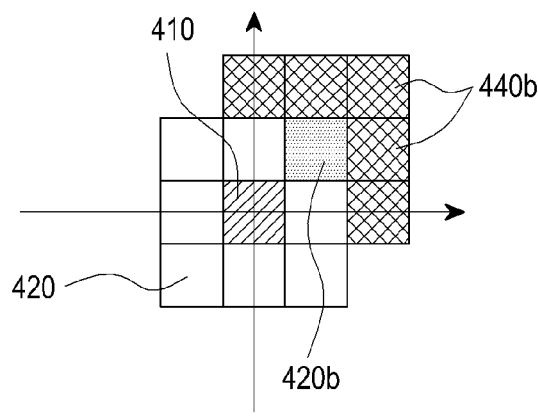

FIG. 6D shows the first matching block 430b searched for from the first 8 adjacent blocks 420. In FIG. 6E, the matcher 220 selects second 5 adjacent blocks 440b adjacent to the first matching block 430a, calculates a SAD value of each of the second adjacent blocks 440b with respect to the edge block 410. and considers a second adjacent block having the smallest SAD value as a second matching block.

An allowable variation of hand tremor (that is, a hand tremor-allowable maximum motion vector magnitude) has to be experimentally set, and herein, preferably, an image with resolution of 640*480 is set with 2~8 (pixel unit), and an image with resolution of 320*240 is set with 1~5.

Referring back to FIGS. 3 and 4, in step S150, the motion vector extractor 230 calculates a distance between each of the image sample blocks and a final corresponding matching block (that is, a block distance or a matching distance), and compares the calculated block distance with a maximum distance, i.e., a predetermined first threshold. The motion vector extractor 230 estimates (or extracts) motion vectors with respect to the image sample blocks, and compares magnitudes of the estimated motion vectors with the maximum distance.

The motion vector corresponds to a displacement vector between an image sample block and a matching block. The maximum distance corresponds to a threshold of a block distance or a matching distance, by which it is determined that there exists a user's intentional motion. When the block distance (or an SA1) value, that is, a matching distance value) is equal to or greater than the maximum distance, it is unconditionally determined that there exists a user's intentional motion, and the image sample block is assigned a predetermined maximum motion vector. The magnitude of the maximum motion vector may be set to be the same as the maximum distance. Step S150 avoids an error in motion estimation, which may be caused by a user's or object's sudden intentional motion.

Figures 7A, 7B:
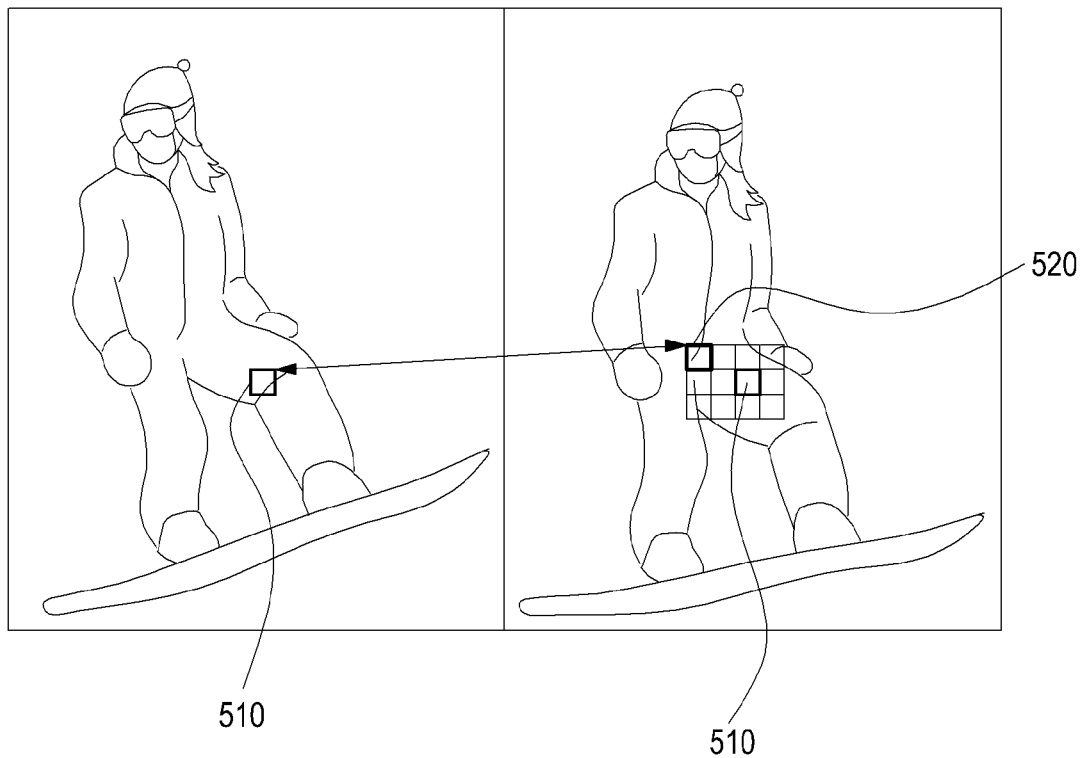
FIGS. 7A and 7B are diagrams illustrating an error in motion estimation from a user's sudden motion, according to an embodiment of the present invention.

FIGS. 7A and 7B are diagrams illustrating an error in motion estimation, according to a user's sudden motion. FIG. 7A shows an image sample block 510 in a previous image frame, and FIG. 7B shows the image sample block 510 and an estimated matching block 520 in a current image frame. As shown, the adaptive neighborhood block search method is not wholly performed, but locally performed. Thus, when an object or a user suddenly moves, an error in motion estimation may occur as shown.

Accordingly, in a case where a Hock distance with respect to a specific image sample block is equal to or greater than a maximum distance as a first threshold, the detected image sample block or its corresponding matching block (or an estimated image sample block) is assigned (or estimated with) a predetermined maximum motion vector. It is thereby determined that a user's intentional action exists. The maximum distance is set as a greater value than a hand tremor allowable value. For example, when a block size is 8*8 (pixel unit), the distance is preferably set as 2000~4000, and when a block size is 16*16, the distance is preferably set as 2000~4000.

Referring again to FIGS. 3 and 4 in step S160, when a block distance with respect to a specific image sample block is greater than or equal to a maximum distance, the motion vector extractor 230 assigns a predetermined maximum motion vector to the image sample block or its corresponding matching block. Step S160 is followed by the second motion vector estimation in step S170. In another embodiment of the present invention, when the block distance with respect to the specific image sample block is greater than or equal to the maximum distance, the second motion vector estimation step S170 may be omitted, and the second comparison (or motion determination) may be performed in step S180 by estimating the maximum motion vector as a representative motion vector. Herein, the number of image sample blocks assigned the maximum motion vector (a threshold equal to or less than the number of all of detected image sample blocks) may be taken into account.

In the second motion vector estimation of step S170, when the block distance with respect to the specific image sample block is less than the maximum distance, the median filter 240 aligns motion vectors assigned or estimated with respect to the image sample blocks in a magnitude order, and estimates a motion vector having a median value as an average (or representative) motion vector with respect to the image sample blocks. Step S170 compensates for degradation of precision in motion estimation according to a reduction in a block size. A motion vector which may be incorrectly estimated is eliminated, improving reliability in motion estimation.

In the second comparison (or motion determination) of step S180, the motion determiner 250 compares the magnitude of the representative motion vector with a predetermined second threshold (less than the maximum motion vector, for example, a hand tremor allowable value). When the magnitude of the representative motion vector is equal to or less than the predetermined second threshold, it is determined that there is no user's motion and there exists a user's hand tremor, or otherwise it is determined that there exists a user's intentional motion.

According to embodiments of the present invention, in an apparatus for determining the presence of motion based on a user's selected region by using a mobile camera, etc., an edge-based adaptive neighborhood block search method is employed to improve the performance in determining the presence of motion. Thus, it is possible to reduce the computational complexity in block matching on a high frequency component, and to improve the precision in motion vector estimation according to the neighborhood block search method.

Also, according to embodiments of the present invention, it is possible to increase the speed in carrying out an algorithm due to the adaptive search method, and at the same time to determine the presence of motion, with high hand-tremor endurance, and reduced computational complexity due to a threshold-based motion determination.

The method and apparatus for determining the presence of a user's hand tremor or intentional motion, according to the embodiments of the present invention, can be realized by hardware, software (that is, a program), or a combination thereof. Such a program may be stored in a computer-readable volatile (or non-volatile) recording medium, and such a recording medium may be a recording device (such as ROM), a memory (such as RAM, a memory chip, an integrated circuit), or an optical or magnetic recording medium (such as CD, DVD, a magnetic disk, a magnetic tape). In other words, the method for determining the presence of a user's hand tremor or intentional motion, according to the embodiments of the present invention, may be executed by a program including codes for realizing the method. Furthermore, this program may be electrically transferred through any medium such as wired or wireless communication signals, and the present invention includes the equivalents thereof.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for determining presence of a user's hand tremor or intentional motion during recognition of an image through photographing, the method comprising the steps of:
   detecting image sample blocks of a previous frame by using an edge detecting method;
   calculating a block distance between a detected image sample block of the previous frame and a corresponding estimated image sample block of a current frame;
   comparing the calculated block distance with a first threshold; and
   comparing the calculated block distance with a second threshold when the calculated block distance is less than the first threshold,
   wherein the first threshold is greater than a hand tremor allowable value for a motion between the detected image sample block of the previous frame and the estimated image sample block of the current frame, and the second threshold is the hand tremor allowable value for the motion between the detected image sample block of the previous frame and the estimated image sample block of the current frame.

2. The method of claim 1, wherein, when the calculated block distance is greater than or equal to the first threshold, it is determined that the intentional motion of the user exists.

3. The method of claim 1, wherein, when the calculated block distance is greater than the second threshold, it is determined that the intentional motion of the user exists, and when the calculated block distance is less than or equal to the second threshold, it is determined that the user's hand tremor exists.

4. The method of claim 1, wherein the image sample blocks are detected by using the edge detecting method with respect to a plurality of blocks obtained by dividing a predetermined region of the previous frame.

5. The method of claim 1, wherein the block distance is estimated by comparison-matching the image sample blocks in the previous frame with neighborhood blocks of image sample blocks in the current frame.

6. The method of claim 1, further comprising the step of calculating a median value of block distances;
   wherein, when the calculated block distance is less than the first threshold, the median value is compared with the second threshold.

7. The method of claim 4, wherein the image sample blocks including edge components are detected from the plurality of blocks, and a predetermined number of the image sample blocks are selected in order from largest to smallest in amount of the edge components.

8. The method of claim 1, wherein:
   neighborhood blocks are classified in an order of adjacency with the detected image sample block, a neighborhood block having a smallest Sum of Absolute Distance (SAD) value with the detected image sample block from among the neighborhood blocks is considered a matching block;
   blocks adjacent to the image sample block or the matching block, detected in a previous step, are selected as neighborhood blocks in a latter step;
   a matching block having the smallest SAD value from among matching blocks in a plurality of steps is selected as a final matching block with respect to the detected image sample block; and
   a block distance between the detected image sample block and the final matching block is estimated.

9. The method of claim 2, wherein, when the calculated block distance is greater than or equal to the first threshold, the detected image sample block is assigned a predetermined maximum block distance.

10. The method of claim 6, wherein, in calculating the median value, the block distances estimated from or assigned to the detected image sample blocks are aligned in a size order, and a block distance aligned in a middle of the aligned block distances is estimated as a representative block distance with respect to the detected image sample blocks.

11. A non-transitory computer-readable recording medium storing a program causing a processor to execute a process for data processing, the process comprising the operations of:
   detecting image sample blocks of a previous frame by using an edge detecting method;
   calculating a block distance between a detected image sample block of the previous frame and a corresponding estimated image sample block of a current frame;
   comparing the calculated block distance with a first threshold; and
   comparing the calculated block distance with a second threshold when the calculated block distance is less than the first threshold,
   wherein the first threshold is greater than a hand tremor allowable value for a motion between the detected image sample block of the previous frame and the estimated image sample block of the current frame, and the second threshold is the hand tremor allowable value for the motion between the detected image sample block of the previous frame and the estimated image sample block of the current frame.

12. A portable terminal including a non-transitory computer-readable recording medium which stores a program causing a processor to execute a process for data processing, the process comprising the operations of:
   detecting image sample blocks of a previous frame by using an edge detecting method;
   calculating a block distance between a detected image sample block of the previous frame and a corresponding estimated image sample block of a current frame;
   comparing the calculated block distance with a first threshold; and
   comparing the calculated block distance with a second threshold when the calculated block distance is less than the first threshold,
   wherein the first threshold is greater than a hand tremor allowable value for a motion between the detected image sample block of the previous frame and the estimated image sample block of the current frame, and the second threshold is the hand tremor allowable value for the motion between the detected image sample block of the previous frame and the estimated image sample block of the current frame.

* * * * *